US009534151B2

(12) United States Patent
Fujimoto et al.

(10) Patent No.: US 9,534,151 B2
(45) Date of Patent: Jan. 3, 2017

(54) SHEET AND ADHESIVE SHEET

(75) Inventors: Hironobu Fujimoto, Saitama (JP); Tsutomu Iida, Hyogo (JP); Tomohide Fukuzaki, Osaka (JP)

(73) Assignees: LINTEC Corporation, Tokyo (JP); Arakawa Chemical Industries, LTD, Osaka (JP)

( * ) Notice: Subject to any disclaimer, the term of this patent is extended or adjusted under 35 U.S.C. 154(b) by 0 days.

(21) Appl. No.: 12/885,607

(22) Filed: Sep. 20, 2010

(65) Prior Publication Data

US 2011/0070433 A1 Mar. 24, 2011

(30) Foreign Application Priority Data

Sep. 24, 2009 (JP) ................................ 2009-219457

(51) Int. Cl.
| | |
|---|---|
| C08G 18/00 | (2006.01) |
| C09J 7/00 | (2006.01) |
| C09J 7/02 | (2006.01) |
| C08G 18/28 | (2006.01) |
| C08G 18/38 | (2006.01) |
| C08G 18/48 | (2006.01) |
| C08G 18/67 | (2006.01) |
| C08G 18/75 | (2006.01) |
| C09J 175/16 | (2006.01) |

(52) U.S. Cl.
CPC ............ *C09J 7/0282* (2013.01); *C08G 18/288* (2013.01); *C08G 18/3876* (2013.01); *C08G 18/4825* (2013.01); *C08G 18/672* (2013.01); *C08G 18/755* (2013.01); *C09J 175/16* (2013.01); *C09J 2475/006* (2013.01); *Y10T 428/2809* (2015.01)

(58) Field of Classification Search
None
See application file for complete search history.

(56) References Cited

U.S. PATENT DOCUMENTS

| | | | | |
|---|---|---|---|---|
| 4,297,185 | A * | 10/1981 | Chevreux et al. | 522/96 |
| 4,946,742 | A | 8/1990 | Landin | |
| 5,278,199 | A * | 1/1994 | Ohkawa | C08F 299/00 257/E21.214 |
| 5,322,861 | A * | 6/1994 | Tsuge | C08G 18/10 522/174 |
| 6,002,383 | A * | 12/1999 | Shimada | G06K 1/128 235/380 |
| 6,139,953 | A | 10/2000 | Nagamoto et al. | |
| 6,200,732 | B1 * | 3/2001 | Tamura et al. | 430/284.1 |
| 6,309,747 | B1 * | 10/2001 | Suwa et al. | 428/378 |
| 6,310,133 | B1 * | 10/2001 | Katashima | B41M 5/42 524/495 |
| 6,333,283 | B1 * | 12/2001 | Urano et al. | 501/54 |
| 6,350,790 | B1 * | 2/2002 | Bishop | C03C 25/106 427/496 |
| 6,524,701 | B1 | 2/2003 | Kondo et al. | |
| 6,646,068 | B2 * | 11/2003 | Chisholm et al. | 526/90 |
| 6,793,762 | B1 | 9/2004 | Kondo et al. | |
| 7,196,136 | B2 * | 3/2007 | Soutar et al. | 524/858 |
| 2005/0238879 | A1 * | 10/2005 | Shoshi et al. | 428/412 |
| 2007/0021521 | A1 | 1/2007 | Cheng et al. | |
| 2007/0054088 | A1 * | 3/2007 | Matijasic | C09J 7/0217 428/123 |
| 2007/0224430 | A1 * | 9/2007 | Iwanaga | 428/446 |
| 2008/0118752 | A1 * | 5/2008 | Inoue | G02B 1/10 428/354 |
| 2008/0190904 | A1 * | 8/2008 | Wakayama et al. | 219/121.72 |
| 2010/0247906 | A1 * | 9/2010 | Lee | H01L 21/6835 428/344 |
| 2010/0295190 | A1 * | 11/2010 | Mitsukura | C08G 73/1042 257/783 |
| 2014/0079947 | A1 | 3/2014 | Tamura et al. | |

FOREIGN PATENT DOCUMENTS

| | | |
|---|---|---|
| JP | 01-121386 H | 5/1989 |
| JP | 02-18486 H | 1/1990 |
| JP | H02296350 A | 12/1990 |
| JP | 05-310810 H | 11/1993 |
| JP | 9253964 A | 9/1997 |
| JP | 11343469 A | 12/1999 |
| JP | 2004083634 A | 3/2004 |
| JP | 2008308549 A | 12/2008 |
| JP | 2009503143 A | 1/2009 |
| JP | 2009040849 A | 2/2009 |
| JP | 2009155539 A | 7/2009 |
| JP | 2010251722 A | 11/2010 |
| JP | 2010254853 A | 11/2010 |
| WO | WO 0147824 A1 * | 7/2001 |
| WO | WO2008149625 A1 * | 12/2008 ......... C08G 73/1042 |
| WO | WO2009020253 A1 * | 2/2009 ............... C09J 8/02 |

OTHER PUBLICATIONS

Sigma-Aldrich data sheet (2010).*
English Abstract of JP3177149.
English Abstract of JP9253964.
English Abstract of JP11343469.
English Abstract of JP3739570.
English abstract of JP2009503143 (A), dated Jan. 29, 2009.
English abstract of JP H05-310810.
English Abstract of H01-121386.
English Abstract of H02-18486.
English abstract of JP2009040849 (A)—Feb. 26, 2009.
English abstract of JP2008308549 (A)—Dec. 25, 2008.
English abstract of JP2004083634 (A)—Mar. 18, 2004.
English abstract of JPH02296350 (A)—Dec. 6, 1990.
English abstract of JP2009155539 (A)—Jul. 16, 2009.
English abstract of JP2010251722 (A)—Nov. 4, 2010.
English abstract of JP2010254853 (A)—Nov. 11, 2010.

* cited by examiner

*Primary Examiner* — Frank D Ducheneaux
(74) *Attorney, Agent, or Firm* — Cahn & Samuels, LLP

(57) ABSTRACT

A sheet is produced by curing an energy ray curable composition which includes a urethane acrylate oligomer and a compound having a thiol group in the molecule. The sheet has heat resistance to prevent outgassing.

15 Claims, No Drawings

SHEET AND ADHESIVE SHEET

This U.S. patent application claims priority of Japanese patent document 2009-219457filed on Sep. 24, 2009 in Japan, the entirety of which is incorporated herein by reference.

TECHNICAL FIELD

The present invention relates to sheets and adhesive sheets having the sheets.

BACKGROUND OF THE INVENTION

As for the substrates for adhesive sheets, resin films produced by polymerizing and curing photopolymerizable urethane acrylate oligomers have been used. Urethane acrylate oligomers are obtained by reacting a polyether polyol or polyester polyol compound and a polyisocyanate compound, as described in Patent Literature 1 (Japanese Patent No. 3739570). With respect to urethane acrylate oligomers from a polyester polyol compound, Patent Literature 2 (Japanese Patent No. 3177149) describes urethane acrylate oligomers that have structural units derived from polyester diol.

However, materials for the production of urethane acrylate oligomers having structural units from polyester diol are limited in variety and tend to be expensive. Urethane acrylate oligomers having structural units from polyether diol cause problems when cured resin films thereof are used in semiconductor-processing sheets such as surface protective tapes, dicing tapes and die-bonding tapes. In detail, because the semiconductor processing sometimes involves high temperatures, the weight of substrates reduce as a result of the outgassing through heat decomposing and are deteriorated to fail to achieve expected performance. Further, the outgassing fail to contaminate surrounding devices and the like.

CITATION LIST

Patent Literature 1: Japanese Patent No. 3739570
Patent Literature 2: Japanese Patent No. 3177149

SUMMARY OF THE INVENTION

Technical Problem

The present invention is aimed at solving the problems in the art as described above. It is therefore an object of the invention to provide inexpensive sheets having heat resistance to prevent outgassing, and adhesive sheets using the sheets.

Solution to Problem

The summary of the present invention aimed at achieving the above object is as follows.

(1) A sheet produced by curing an energy ray curable composition which comprises a urethane acrylate oligomer and a compound having a thiol group in the molecule.

(2) The sheet described in (1), wherein the content of the compound having a thiol group is 2 mmol or more based on 100 g of the urethane acrylate oligomer.

(3) The sheet described in (1) or (2), wherein the urethane acrylate oligomer comprises a structural unit derived from a polyether diol.

(4) The sheet described in any one of (1) to (3), wherein the sheet has a thermal weight reduction percentage of 6% or less when the sheet is allowed to stand in an air atmosphere at 180° C. for 60 minutes.

(5) The sheet described in any one of (1) to (4), wherein the sheet has a breaking elongation of 50% or more.

(6) The sheet described in any one of (1) to (5), wherein the sheet has a tensile elastic modulus in the range of 10 to 1000 MPa.

(7) An adhesive sheet comprising the sheet of any one of (1) to (6) and an adhesive layer on at least one surface of the sheet.

Advantageous Effects of the Invention

According to the present invention, inexpensive sheets and adhesive sheets having the sheets that are suppressed outgassing are provided by curing the energy ray curable composition which contains a urethane acrylate oligomer and a compound having a thiol group in the molecule, so that the sheet can suppress outgassing of the sheet even when using in the semiconductor manufacturing with high temperatures.

DETAIL DESCRIPTION OF THE INVENTION

Hereinbelow, preferred embodiments including best modes of the present invention will be described in detail. A sheet according to the present invention is produced by curing an energy ray curable composition which comprises a urethane acrylate oligomer and a compound having a thiol group in the molecule (hereinafter, also referred to as "thiol group-containing compound"). The urethane acrylate oligomers and the thiol group-containing compounds will be described below.

The urethane acrylate oligomers are compounds having a (meth)acryloyl group and a urethane bond. The urethane acrylate oligomers may be obtained by, for example, reacting a polyisocyanate, a (meth)acrylate having a hydroxyl group, and optionally a polyol. When the urethane acrylate oligomers have two or more (meth)acryloyl groups in the molecule, tackiness of the obtainable sheets is suppressed.

Examples of the polyisocyanates include aliphatic polyisocyanates such as tetramethylene diisocyanate, hexamethylene diisocyanate and trimethylhexamethylene diisocyanate; alicyclic diisocyanates such as isophorone diisocyanate, norbornane diisocyanate, dicyclohexylmethane-4,4'-diisocyanate, dicyclohexylmethane-2,4'-diisocyanate and ω,ω'-diisocyanate dimethylcyclohexane; and aromatic diisocyanates such as 4,4'-diphenylmethane diisocyanate, tolylene diisocyanate, xylylene diisocyanate, tolidine diisocyanate, tetramethylenexylylene diisocyanate and naphthalene-1,5-diisocyanate. Of these, isophorone diisocyanate and hexamethylene diisocyanate are preferable because the obtainable urethane acrylate oligomers maintain low viscosity and show good handling properties.

The (meth)acrylates having a hydroxyl group are not particularly limited as long as the compounds have a hydroxyl group and a (meth)acryloyl group in the molecule. Known such compounds maybe used, with examples including hydroxyalkyl (meth)acrylates such as 2-hydroxyethyl (meth)acrylate, 2-hydroxypropyl (meth)acrylate, 4-hydroxybutyl (meth)acrylate, 4-hydroxycyclohexyl (meth)acrylate, 5-hydroxycyclooctyl (meth)acrylate, 2-hydroxy-3-phenyloxypropyl (meth)acrylate and pentaerythritol tri (meth)acrylate; hydroxyl group-containing (meth) acrylamides such as N-methylol (meth)acrylamide; α-hydroxyalkyl (meth)acrylates such as polyethylene glycol (meth)acrylate, polypropylene glycol (meth)acrylate and α-hydroxymethyl (meth)acrylate; products from the reaction of diglycidyl ethers of bisphenol A, with (meth)acrylic acid.

The polyols are not particularly limited as long as the compounds have two or more hydroxyl groups. Known such compounds may be used, with examples including glycols such as ethylene glycol, diethylene glycol, triethylene glycol, 1,2-propanediol, 1,3-propanediol, 1,3-butanediol, 1,4-butanediol, neopentyl glycol, pentanediol, 3-methyl-1,5-pentanediol, 2,2,4-trimethyl-1,3-pentanediol, hexanediol, octanediol, 2,2-diethyl-1,3-propanediol, 2-ethyl-2-butyl-1,3-propanediol, 1,4-cyclohexanedimethanol, and adducts of bisphenol A with ethylene glycol or propylene glycol; polyfunctional polyols such as trimethylolpropane and glycerine; alkyl glycidyl ethers such as n-butyl glycidyl ether; and glycidyl monocarboxylates such as diglycidyl versatate. Examples further include polyester polyols obtained by reacting the above glycols with polybasic acid components, and high-molecular weight polyols such as polyether polyols and polycarbonate polyols, with the polyether polyols being preferable.

The polybasic acid components used in the production of the polyester polyols may be known polybasic acid components used to form polyesters. Specific examples include dibasic acids such as adipic acid, maleic acid, succinic acid, oxalic acid, fumaric acid, malonic acid, glutaric acid, pimelic acid, azelaic acid, sebacic acid and suberic acid; aromatic polybasic acids; and anhydrides of these polybasic acids, derivatives of the acids or anhydrides, and dimer acids and hydrogenated dimer acids of these polybasic acids. To produce sheets having appropriate hardness, the aromatic polybasic acids are preferably used. Examples of the aromatic polybasic acids include dibasic acids such as phthalic acid, isophthalic acid, terephthalic acid and 2,6-naphthalenedicarboxylic acid; polybasic acids such as trimellitic acid and pyromellitic acid; and acid anhydrides of these polybasic acids, and derivatives of the acids or anhydrides. The esterification reaction may involve known catalysts as required. Exemplary catalysts include tin compounds such as dibutyl tin oxide and stannous octylate; and alkoxytitaniums such as tetrabutyl titanate and tetrapropyl titanate. The amount of the catalysts is not particularly limited. From the viewpoints of reaction rate and reaction control, the catalysts may be reasonably used at about 10 to 500 ppm. The reaction temperature in the esterification is not particularly limited, but is reasonably in the range of 150 to 300° C. from the viewpoints of reaction rate and reaction control.

The polyether polyols are not particularly limited, and known such compounds may be used. A typical polyether polyol is a polyether diol, represented by HO—(—R—O—)$_n$—H. Here, R is a divalent hydrocarbon group, preferably an alkylene group, more preferably a C1-6 alkylene group, and particularly preferably a C2 or C3 alkylene group. Of the C1-6 alkylene groups, ethylene, propylene and butylene are preferable, and ethylene and propylene are particularly preferable. The letter n is preferably in the range of 2 to 200, and more preferably 10 to 100. Particularly preferred polyether diols are therefore polyethylene glycol, polypropylene glycol, polybutylene glycol and polytetramethylene glycol, and more preferred polyether diols are polyethylene glycol and polypropylene glycol.

The polyether diol reacts with the polyisocyanate compound to provide an ether bond segment (—(—R—O—)$_n$-), resulting in an, isocyanate-terminated urethane prepolymer. The ether bond segment may be a structure derived by ring-opening reaction of cyclic ethers such as ethylene oxide, propylene oxide and tetrahydrofuran. The use of such polyether diols results in urethane acrylate oligomers having structural units derived from the polyether diols.

The polycarbonate polyols are not particularly limited, and known such compounds may be used. Specific examples include reaction products between the aforementioned glycols and alkylene carbonates.

The molecular weight of the high-molecular weight polyols is not particularly limited, but is preferably in the range of about 500 to 10000.

The usage amounts of the polyisocyanate and the (meth)acrylate having a hydroxyl group are not particularly limited, but are preferably such that the ratio (equivalents of the isocyanate groups of the polyisocyanate)/(equivalents of the hydroxyl groups of the (meth)acrylate having a hydroxyl group) is about 0.5 to 1. When the polyol is used, the amounts are preferably such that the ratio (equivalents of the isocyanate groups of the polyisocyanate)/(equivalents of the total hydroxyl groups of the (meth)acrylate having a hydroxyl group and the polyol) is about 0.5 to 1.

The polyisocyanate, the (meth)acrylate having a hydroxyl group, and optionally the polyol may be reacted together at about 60 to 100° C. for about 1 to 4 hours, optionally in a solvent in the presence of a catalyst as required. In another embodiment, the polyisocyanate and the polyol may be reacted together such that some isocyanate groups remain unreacted at about 60 to 100° C. for about 1 to 4 hours optionally in a solvent in the presence of a catalyst as required, and the (meth)acrylate having a hydroxyl group may be added and reacted therewith at about 60 to 100° C. for about 1 to 4 hours.

The weight average molecular weight of the urethane acrylate oligomers obtained as described above is not particularly limited, but is preferably about 1000 to 30000, and more preferably about 2000 to 10000. When the weight average molecular weight is 1000 or more, the breaking elongation of the obtainable sheets may be increased. When the weight average molecular weight is 30000 or less, the tackiness of the obtainable sheets may be suppressed.

The thiol group-containing compounds are not particularly limited as long as the compounds have at least one thiol group in the molecule. Known such compounds may be used, with examples including nonyl mercaptan, 1-dodecanethiol, 1,2-ethanedithiol, 1,3-propanedithiol, triazinethiol, triazinedithiol, triazinetrithiol, 1,2,3-propanetrithiol, tetraethylene glycol-bis(3-mercaptopropionate), trimethylolpropane tris(3-mercaptopropionate), pentaerythritol tetrakis(3-mercaptopropionate), pentaerythritol tetrakis thioglycolate, dipentaerythritol hexakis(3-mercaptopropionate), tris[(3-mercaptopropionyloxy)-ethyl]-isocyanurate, 1,4-bis(3-mercaptobutyryloxy)butane, pentaerythritol tetrakis(3-mercaptobutyrate) and 1,3,5-tris(3-mercaptobutyloxyethyl)-1,3,5-triazine-2,4,6-(1H, 3H, 5H)-trione.

The content of the thiol group-containing compound is preferably 2 mmol or more, more preferably in the range of 3 to 100 mmol, and particularly preferably 4 to 85 mmol based on 100 g (in terms of solid) of the urethane acrylate oligomer. When the content of the thiol group-containing compound is 2 mmol or more, outgassing of the resulting sheets under heating can be remarkably suppressed. Therefore, when an adhesive sheet having the sheet and an adhesive layer on one surface thereof is used in semiconductor manufacturing steps with heating, the weight reduction and consequent deterioration of the sheet by the outgassing may be prevented. When the content of the thiol group-containing compound is 100 mmol or less, the compound will not remain as uncured components. If the content exceeds 100 mmol, uncured components will be remained and sheet-forming properties may be lowered.

The molecular weight of the thiol group-containing compounds is preferably in the range of 200 to 3000, and more preferably 300 to 2000. If the thiol group-containing compounds have a molecular weight in excess of 3000, the compatibility with the urethane acrylate oligomers is reduced and sheet-forming properties may be lowered.

It is often the case that the sheet production is difficult with the urethane acrylate oligomers and the thiol compounds alone. Therefore, the materials are usually diluted with energy ray polymerizable monomers, sheets are provided by conducting film-formation from the dilute materials and thereafter curing.

Examples of the energy ray polymerizable monomers used to dilute the urethane acrylate oligomers include (meth) acrylates of C1-30 alkyl groups such as methyl (meth) acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, n-hexyl (meth)acrylate, 2-ethylhexyl (meth) acrylate, n-octyl (meth)acrylate, nonyl (meth)acrylate, decyl (meth) acrylate, undecyl (meth)acrylate, dodecyl (meth)acrylate, tridecyl (meth)acrylate, tetradecyl (meth)acrylate, hexadecyl (meth)acrylate, octadecyl (meth)acrylate and eicosyl (meth)acrylate; alicyclic (meth)acrylates such as isobornyl (meth)acrylate, dicyclopentenyl (meth)acrylate, dicyclopentanyl (meth)acrylate, dicyclopentenyl oxy-(meth)acrylate, cyclohexyl (meth)acrylate and adamantane (meth)acrylate; aromatic (meth)acrylates such as phenyl hydroxypropyl acrylate and benzyl acrylate; and heterocyclic (meth)acrylates such as tetrahydrofurfuryl (meth)acrylate, morpholine acrylate, N-vinylpyrrolidone and N-vinylcaprolactam. Polyfunctional (meth)acrylates may be used as required.

From the viewpoint of compatibility with the urethane acrylate oligomers, the alicyclic (meth)acrylates, aromatic (meth)acrylates and heterocyclic (meth)acrylates having relatively bulky groups are preferable.

The energy ray polymerizable monomer is preferably used in an amount of 10 to 500 parts by mass, and more preferably 30 to 300 parts by mass based on 100 parts by mass (in terms of solid) of the urethane acrylate oligomer.

The sheets according to the present invention may be produced by film-forming and curing the energy ray curable composition including the urethane acrylate oligomer and the thiol group-containing compound. The incorporation of a photopolymerization initiator in the composition allows for reduction of polymerization/curing time and dose of energy ray irradiation. The photopolymerization initiators are not particularly limited, and examples thereof include alkylphenone photopolymerization initiators such as 2,2-dimethoxy-1,2-diphenylethan-1-one, 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propan-1-one, 2-hydroxy-1-[4-[4-(2-hydroxy-2-methyl-propionyl)-benzyl]phenyl]-2-methyl-propan-1-one, 2-methyl-1-(4-methylthiophenyl)-2-morpholinopropan-1-one and 2-benzyl-2-dimethylamino-1-(4-morpholinophenyl)-butanone-1,2-(dimethylamino)-2-[(4-methylphenyl) methyl]-1-[4-(4-morpholinyl)phenyl]-1-butanone; acylphosphine oxide photopolymerization initiators such as 2,4,6-trimethylbenzoyl-diphenyl-phosphine oxide and bis(2,4,6-trimethylbenzoyl)-phenylphosphine oxide; titanocene photopolymerization initiators such as bis($\eta^5$-2,4-cyclopentadien-1-yl)-bis[2,6-difluoro-3-(1H -pyrrol-1-yl)-phenyl]titanium; oxime ester photopolymerization initiators such as 1,2-octanedione-1-[4-(phenylthio)-2-(O-benzoyl oxime)] and ethanone-1-[9-ethyl-6-(2-methylbenzoyl)-9H-carbazol-3-yl]-1-(O-acetyl oxime); benzophenone photopolymerization initiators such as benzophenone, p-chlorobenzophenone, benzoylbenzoic acid, methyl o-benzoylbenzoate, 4-methylbenzophenone, 4-phenylbenzophenone, hydroxybenzophenone, acrylated benzophenone, 4-benzoyl-4'-methyl-diphenyl sulfide, 3,3'-dimethyl-4-methoxybenzophenone, 2,4,6-trimethylbenzophenone and 4-(13-acryloyl-1,4,7,10,13-pentaoxatridecyl)-benzophenone; and thioxanthone photopolymerization initiators such as thioxanthone, 2-chlorothioxanthone, 3-methylthioxanthone, 2,4-dimethylthioxanthone, 2,4-diisopropylthioxanthone, 2,4-dichlorothioxanthone, 1-chloro-4-propoxythioxanthone, 2-methylthioxanthone, 2-isopropylthioxanthone and 4-isopropylthioxanthone.

The photopolymerization initiators may be used singly, or two or more kinds may be used in combination. The photopolymerization initiators may be used in combination with photopolymerization initiation auxiliaries such as triisopropanolamine and 4,4'-diethylaminobenzophenone.

The usage amount of the photopolymerization initiator is preferably in the range of 0.05 to 10 parts by mass, more preferably 0.1 to 5.0 parts by mass, and particularly preferably 0.5 to 2.0 parts by mass based on 100 parts by mass (in terms of solid) of the energy ray curable composition.

The curable composition may contain inorganic fillers such as calcium carbonate, silica and mica, metal fillers such as iron and lead, and organic fillers such as polystyrene, polymethyl (meth)acrylate, polyethyl (meth)acrylate and styrene-butadiene rubber. In addition to these components, the composition may contain other additives such as colorants including pigments and dyes.

For the method of film-formation, a casting (flow casting) method may be preferably adopted. In detail, the liquid energy ray curable composition (for example, the resin before curing, or a solution of the resin) may be cast on a casting carrier sheet or the like to form a thin coating, and the coating may be irradiated with activation energy rays to polymerize and cure the composition, resulting in a sheet of the invention. In another embodiment, the energy ray curable composition may be semi-cured by irradiation with activation energy rays, another casting carrier sheet may be superposed on the curable composition, and the composition may be cured with activation energy rays to form a sheet according to the invention. According to these production processes, the stress applied to the resin during the sheet production is small and the occurrence of fish eyes is reduced. Further, the sheets manufactured by the above processes have high uniformity in thickness, and the thickness accuracy is usually within 2%. The sheets manufactured according to the above method have high breaking elongation and small tensile elastic modulus.

Other sheet production processes include T-die extrusion, blown-film extrusion and calendering. When an adhesive layer is provided on the sheet according to the invention, the sheet may be corona-treated or may have another layer such as a primer to increase adhesion with the adhesive layer.

UV rays, electron beams or the like are generally used as the activation energy rays. The dose of the activation energy rays depends on the kind of the activation energy rays. In the case of UV rays, the dose is preferably about 10 to 2000 mJ/cm$^2$. With electron beams, the dose is preferably about 10 to 1000 krad. UV irradiation may be performed with a high-pressure mercury lamp, a fusion H lamp or a xenon lamp.

The sheets according to the present invention are low in occurrence of outgassing under a heating environment. In detail, the sheets preferably have a thermal weight reduction percentage of 6% or less, and more preferably 4% or less when the sheets are allowed to stand in an air atmosphere at 180° C. for 60 minutes. Because the sheets of the invention do not substantially cause outgassing, the sheets are not deteriorated even when adhesive sheets having the inventive sheet are used in a semiconductor manufacturing process involving heating. Further, the sheets of the invention that are substantially free from outgassing do not contaminate semiconductor production apparatuses, semiconductor wafers or semiconductor chips in the steps of the semiconductor manufacturing.

The sheets of the invention preferably have a breaking elongation of 50% or more, and more preferably in the range of 60 to 300%. When the sheet having breaking elongation within the above range is used as dicing sheets in the semiconductor processing, the sheet is hardly broken if the dicing sheets are expanded after dicing and thereby the spaces between chips formed by cutting a workpiece can be increased easily.

The sheets preferably have a tensile elastic modulus in the range of 10 to 1000 MPa, and more preferably 100 to 500 MPa. When the sheet having tensile elastic modulus within the above range is used as surface protective sheets in the semiconductor processing, the sheet can satisfactorily follow the bumpy contour of electrode elements on the surface of an adherend and the sheets absorb the irregularities to allow for flat backgrinding without influences of the irregularities on the front side.

The thickness of the sheets in the invention is not particularly limited, but is preferably in the range of 30 to 1000 μm, and more preferably 80 to 500 μm.

The sheets of the invention may form adhesive sheets by having an adhesive layer on one surface of the sheets, and such adhesive sheets may be used in all steps for the manufacturing of semiconductor devices. For example, when the adhesive sheets are used in a backgrinding step or a dicing step for semiconductor wafers, the adhesive sheets permit the processing of the semiconductor wafers without wafer warpage and may be peeled from the semiconductor wafers without breakage of the sheets.

In the case where the adhesive layer is formed of a UV ray curable adhesive and UV rays are used as the energy rays for curing the adhesive as will be described later, the sheets of the invention are preferably transparent to UV rays. When electron beams are used as the energy rays, it is not necessary that the sheets be transparent. In such cases, the sheets may therefore be as described above or may be colored transparent sheets or nontransparent sheets.

The surface of the sheet on which the adhesive layer will be provided may be corona-treated or may have a primer layer in order to achieve higher adhesion with the adhesive. The surface of the sheet opposite to the adhesive layer may be coated with a variety of coating films. The adhesive sheets are manufactured by providing an adhesive layer on the sheets as described hereinabove. The adhesive sheet may have adhesive layers on both sides of the sheet.

The adhesive layer may be formed of any known adhesives without limitation. Examples of the adhesives include rubber-based adhesives, acrylic adhesives, silicone-based adhesives and polyvinyl ether adhesives. Energy ray curable adhesives, heat-foaming adhesives and water-swellable adhesives may be used. Particularly preferred energy ray curable (e.g., UV ray curable, electron beam curable) adhesives are UV ray curable adhesives. The adhesive layer may be laminated with a release sheet which protects the adhesive layer until the use thereof.

The release sheets are not particularly limited, and sheets such as films and papers that are release-treated with a releasing agent may be used. The films include films of resins such as polyethylene terephthalate, polypropylene and polyethylene, and foamed films of these films. The papers include glassine paper, coated paper and laminated paper. The releasing agents include silicone compounds, fluoro compounds and carbamates containing long-chain alkyl groups.

The adhesive layer may be applied on a release sheet so that a predetermined thickness and may be transferred on the sheet of the invention. Alternatively, the adhesive layer may be formed by direct application on the sheet.

The thickness of the adhesive layers is not particularly limited, but is usually in the range of about 5 to 200 μm, and preferably about 10 to 120 μm.

The applications of the sheets of the present invention are not limited to adhesive sheets used in the steps for the semiconductor manufacturing as described above. The sheets may be used in other applications such as marking films, window films and protective films. In particular, the sheets of the invention are suitably used in applications exposed to high-temperature environments.

EXAMPLES

The present invention will be described based on examples hereinbelow, but the scope of the invention is not limited to such examples. In examples and comparative examples below, the thermal weight reduction percentage, breaking elongation and tensile elastic modulus of the sheets were measured as follows.

<Measurement of Thermal Weight Reduction Percentage of Sheet>

A sheet was heated to 180° C. at a temperature increasing rate of 20° C./min using a thermogravimetry analyzer (DTG60 manufactured by Shimadzu Corporation), and was held at the temperature for 60 minutes. The consequent thermal weight reduction percentage was measured.

<Measurement of Breaking Elongation and Tensile Elastic Modulus of Sheet>

A test piece (width: 15 mm, length: 140 mm, thickness: 100 pm) was tested in accordance with JIS K7161: 1994 and JIS K7127: 1999 to determine the breaking elongation. In detail, when the test piece did not have a yield point, the tensile strain at break was measured, and the nominal tensile strain at break was measured when the test piece had a yield point. Prior to the measurement, labels for elongating the test piece were attached to edge portions that were 20 mm from each edge to prepare a dumbbell-shaped sample (width: 15 mm, length: 100 mm), and the sample was tensile tested at a stress rate of 200 mm/min with a universal tester (AUTOGRAPH AG-IS 500N manufactured by Shimadzu Corporation) to determine the tensile elastic modulus at the same time.

Example 1

To an isocyanate-terminated urethane prepolymer obtained by polymerizing 33 g of polypropylene glycol having a weight average molecular weight of 4000 (hereinafter referred to as PPG 4000) and 5 g of isophorone diisocyanate (hereinafter referred to as IPDI), was reacted 10 g of pentaerythritol triacrylate (hereinafter referred to as PETA) to give a urethane acrylate oligomer having a weight average molecular weight of 17350.

The urethane acrylate oligomer in an amount of 100 g (in terms of solid) was combined with 66.7 g of isobornyl acrylate as a diluting monomer, 0.83 g of 2-hydroxy-2-methyl-1-phenyl-propan-1-one (DAROCUR 1173 manufactured by Ciba Specialty Chemicals, solid concentration: 100% by mass) as a photopolymerization initiator and 3.3 g (8.9 mmol) of tetraethylene glycol-bis(3-mercaptopropionate) (EGMP-4 manufactured by SAKAI CHEMICAL INDUSTRY CO., LTD., solid concentration: 100% by mass) as a compound having a thiol group to give an energy ray curable composition that was liquid at normal temperature (viscosity η=3940 mPa·s at 25° C.)

The energy ray curable composition was applied on a casting carrier sheet that was a polyethylene terephthalate (PET) film (T-100 manufactured by Mitsubishi Chemical Polyester Film Corporation, thickness: 38 μm) according to a fountain die technique such that the thickness would be 100 μm, thereby forming a curable composition layer. UV rays were applied from the side of the curable composition layer. The UV irradiation apparatus was a belt conveyer type UV irradiation apparatus (ECS-401GX manufactured by EYE GRAPHICS Co., Ltd.), and the UV source was a high-pressure mercury lamp (H04-L41 manufactured by EYE GRAPHICS Co., Ltd. (conditions: lamp height 150 mm, lamp output 3 kW (reduced output 120 mW/cm), illumination intensity at light wavelength of 365 nm 271 mW/cm$^2$, dose 177 mJ/cm$^2$ (measured with UV actinometer UV-351 manufactured by ORC MANUFACTURING CO., LTD.)). Immediately after the irradiation, another identical PET film was laminated on the curable composition layer, and UV rays were applied through the newly laminated PET film two times to crosslink and cure the composition (conditions: lamp height 150 mm, lamp output 3 kW (reduced output 120 mW/cm), illumination intensity at light wavelength of 365 nm 271 mW/cm$^2$, dose 600 mJ/cm$^2$ (measured with UV actinometer UV-351 manufactured by ORC MANUFACTURING CO., LTD.)). Thereafter, the PET films were peeled and a UV-cured sheet having a thickness of 100 μm was obtained. The sheet was tested to measure the thermal weight reduction percentage, the breaking elongation and the tensile elastic modulus. The results are set forth in Table 1.

Example 2

A sheet was obtained and evaluated in the same manner as in Example 1, except that the compound having a thiol group used in Example 1 was replaced by 4.6 g (8.8 mmol) of tris [(3-mercaptopropionyloxy)-ethyl]-isocyanurate (TEMPIC manufactured by SAKAI CHEMICAL INDUSTRY CO., LTD., solid concentration: 100% by mass) as a compound having a thiol group. The results are set forth in Table 1.

Example 3

A sheet was obtained and evaluated in the same manner as in Example 1, except that the compound having a thiol group used in Example 1 was replaced by 4.3 g (8.8 mmol) of pentaerythritol tetrakis(3-mercaptopropionate) (PEMP manufactured by SAKAI CHEMICAL INDUSTRY CO., LTD., solid concentration: 100% by mass) as a compound having a thiol group. The results are set forth in Table 1.

Example 4

A sheet was obtained and evaluated in the same manner as in Example 1, except that the compound having a thiol group used in Example 1 was replaced by 7.0 g (8.9 mmol) of dipentaerythritol hexakis (3-mercaptopropionate) (DPMP manufactured by SAKAI CHEMICAL INDUSTRY CO., LTD., solid concentration: 100% by mass) as a compound having a thiol group. The results are set forth in Table 1.

Example 5

To an isocyanate-terminated urethane prepolymer obtained by polymerizing 33 g of polypropylene glycol having a weight average molecular weight of 1000 and 9 g of IPDI, was reacted 8 g of PETA to give a urethane acrylate oligomer having a weight average molecular weight of 20690.

The urethane acrylate oligomer in an amount of 100 g (in terms of solid) was combined with 96 g of isobornyl acrylate as a diluting monomer, 1.0 g of 2,4,6-trimethylbenzoyldiphenylphosphine oxide (DAROCUR TPO manufactured by Ciba Specialty Chemicals, solid concentration: 100% by mass) as a photopolymerization initiator and 4.0 g (10.0 mmol) of trimethylolpropane tris(3-mercaptopropionate) (TMMP manufactured by SAKAI CHEMICAL INDUSTRY CO., LTD., solid concentration: 100% by mass) as a compound having a thiol group to give an energy ray curable composition that was liquid at normal temperature (viscosity η=4480 mPa·s at 25° C.). A sheet was obtained and evaluated in the same manner as in Example 1, except that the above energy ray curable composition was used. The results are set forth in Table 1.

Example 6

A sheet was obtained and evaluated in the same manner as in Example 1, except that the compound having a thiol group used in Example 1 was replaced by 2.2 g (10.8 mmol) of 1-dodecanethiol (manufactured by Sigma-Aldrich Co., solid concentration: 100% by mass) as a compound having a thiol group. The results are set forth in Table 1.

Example 7

A sheet was obtained and evaluated in the same manner as in Example 1, except that the compound having a thiol group used in Example 1 was replaced by 4.2 g (5.4 mmol) of dipentaerythritol hexakis(3-mercaptopropionate) (DPMP manufactured by SAKAI CHEMICAL INDUSTRY CO., LTD., solid concentration: 100% by mass) as a compound having a thiol group. The results are set forth in Table 1.

Example 8

A sheet was obtained and evaluated in the same manner as in Example 1, except that the compound having a thiol group used in Example 1 was replaced by 14.6 g (29.8 mmol) of pentaerythritol tetrakis(3-mercaptopropionate) (PEMP manufactured by SAKAI CHEMICAL INDUSTRY CO., LTD., solid concentration: 100% by mass) as a compound having a thiol group. The results are set forth in Table 1.

Example 9

A sheet was obtained and evaluated in the same manner as in Example 1, except that the compound having a thiol group used in Example 1 was replaced by 39.2 g (80.2 mmol) of pentaerythritol tetrakis(3-mercaptopropionate) (PEMP manufactured by SAKAI CHEMICAL INDUSTRY CO., LTD., solid concentration: 100% by mass) as a compound having a thiol group. The results are set forth in Table 1.

Example 10

A sheet was obtained and evaluated in the same manner as in Example 1, except that the compound having a thiol group used in Example 1 was replaced by 43.2 g (88.3 mmol) of pentaerythritol tetrakis(3-mercaptopropionate) (PEMP manufactured by SAKAI CHEMICAL INDUSTRY CO., LTD., solid concentration: 100% by mass) as a compound having a thiol group. The results are set forth in Table 1.

Comparative Example 1

A sheet was obtained and evaluated in the same manner as in Example 1, except that the compound having a thiol group was not used. The results are set forth in Table 1.

Comparative Example 2

To an isocyanate-terminated urethane prepolymer obtained by polymerizing 52 g of PPG 4000 and 6 g of IPDI, was reacted 12 g of PETA to give a urethane acrylate oligomer having a weight average molecular weight of 18920.

The urethane acrylate oligomer in an amount of 100 g (in terms of solid) was combined with 28.4 g of isobornyl acrylate as a diluting monomer, 14.2 g of trimethylolpropane triacrylate (TMPTA manufactured by DAICEL CHEMICAL INDUSTRIES, LTD., solid concentration: 100% by mass) and 0.71 g of 2-hydroxy-2-methyl-1-phenyl-propan-1-one (DAROCUR 1173 manufactured by Ciba Specialty Chemicals, solid concentration: 100% by mass) as a photopolymerization initiator to give an energy ray curable resin composition (viscosity η=8390 mPa·s at 25° C.). A sheet was obtained and evaluated in the same manner as in Example 1, except that the above energy ray curable resin composition was used. The results are set forth in Table 1.

Comparative Example 3

Instead of the cured sheets from the energy ray curable compositions, a polyethylene terephthalate (PET) film (COSMOSHINE A4300 manufactured by TOYOBO CO., LTD., thickness: 188 μm) was evaluated.

Comparative Example 4

Instead of the cured sheets from the energy ray curable compositions, a polyethylene naphthalate (PEN) film (TEONEX Q83 manufactured by Teijin DuPont Film Japan Limited, thickness: 25μm) was evaluated.

TABLE 1

|  | Thermal weight reduction percentage (%) | Breaking elongation (%) | Tensile elastic modulus (MPa) |
| --- | --- | --- | --- |
| Ex. 1 | 3.4 | 91 | 100 |
| Ex. 2 | 1.5 | 101 | 120 |
| Ex. 3 | 1.8 | 91 | 117 |
| Ex. 4 | 1.7 | 81 | 111 |
| Ex. 5 | 1.9 | 95 | 151 |
| Ex. 6 | 3.3 | 77 | 119 |
| Ex. 7 | 2.1 | 66 | 161 |
| Ex. 8 | 1.5 | 102 | 39 |
| Ex. 9 | 1.5 | 150 | 25 |
| Ex. 10 | 1.9 | 142 | 1.1 |
| Comp. Ex. 1 | 33.4 | 80 | 207 |
| Comp. Ex. 2 | 29.4 | 19 | 193 |
| Comp. Ex. 3 | 1.3 | 155 | 4794 |
| Comp. Ex. 4 | 0.7 | 111 | 6567 |

The results in Table 1 show that the sheets in Comparative Examples 1 to 4 were inferior in one or more of the thermal weight reduction percentage, the breaking elongation and the tensile elastic modulus to the sheets in Examples 1 to 10.

The sheets according to the present invention have excellent heat resistance as demonstrated above. It is therefore apparent that the adhesive sheets of the invention using the sheets similarly have excellent heat resistance.

The invention claimed is:

1. A sheet produced by curing an energy ray curable composition which comprises:
    a urethane acrylate oligomer;
    a compound having a thiol group in the molecule;
    a photopolymerization initiator, and
    an energy ray polymerizable monomer,
    wherein said compound having a thiol group in the molecule comprises at least one selected from the group consisting of nonyl mercaptan, 1-dodecanethiol, 1,2-ethanedithiol, 1,3-propanedithiol, triazinethiol, triazinedithiol, triazinetrithiol, 1,2,3-propanetrithiol, tetraethylene glycol-bis(3-mercaptopropionate), trimethylolpropane tris(3-mercaptopropionate), pentaerythritol tetrakis(3-mercaptopropionate), pentaerythritol tetrakis thioglycolate, dipentaerythritol hexakis(3-mercaptopropionate), tris[(3-mercaptopropionyloxy)-ethyl]-isocyanurate, 1,4-bis(3-mercaptobutyryloxy)butane, pentaerythritol tetrakis(3-mercaptobutyrate) and 1,3,5-tris(3-mercaptobutyloxyethyl)-1,3,5-triazine-2,4,6-(1H, 3H, 5H)-trione,
    wherein the sheet has a thermal weight reduction percentage of 2.1% or less when the sheet is allowed to stand in an air atmosphere at 180° C. for 60 minutes,
    wherein a weight average molecular weight of the urethane acrylate oligomer is 1,000 to 30,000 and
    wherein an amount of the energy ray polymerizable monomer is 30 to 300 parts by mass based on 100 parts by mass, in terms of solid, of the urethane acrylate oligomer.

2. The sheet according to claim 1, wherein the content of the compound having a thiol group is 2 mmol or more based on 100 g of the urethane acrylate oligomer.

3. The sheet according to claim 1, wherein the urethane acrylate oligomer comprises a structural unit derived from a polyether diol.

4. The sheet according to claim 1, wherein the sheet has a breaking elongation of 50% or more.

5. The sheet according to claim 1, wherein the sheet has a tensile elastic modulus in the range of 10 to 1000 MPa.

6. The sheet according to claim 1, wherein the sheet has a thickness of 80 to 500 μm.

7. An adhesive sheet comprising:
    the sheet of claim 1; and
    an adhesive layer on at least one surface of the sheet.

8. The sheet according to claim 1, wherein the photopolymerization initiator comprises an alkylphenone photopolymerization initiator.

9. The sheet according to claim 1, wherein said compound having a thiol group in the molecule comprises tetraethylene glycol-bis(3-mercaptopropionate).

10. The sheet according to claim 1, wherein the sheet has a thermal weight reduction percentage of 1.5-2.1% when the sheet is allowed to stand in an air atmosphere at 180° C. for 60 minutes.

11. The sheet according to claim 1, wherein the energy ray polymerizable monomer comprises an aromatic(meth)acrylate selected from the group consisting of phenyl hydroxypropyl acrylate and benzyl acrylate.

12. The sheet according to claim 1, wherein the energy ray polymerizable monomer comprises a heterocyclic(meth)acrylate selected from the group consisting of tetrahydrofurfuryl(meth)acrylate, morpholine acrylate, N-vinylpyrrolidone and N-vinylcaprolactam.

13. The adhesive sheet according to claim 7, wherein the adhesive layer has a thickness of 10 to 120 μm.

14. A method of producing a sheet comprising curing an energy ray curable composition comprising a urethane acrylate oligomer; a compound having a thiol group in the molecule; a photopolymerization initiator; and an energy ray polymerizable monomer,
wherein said compound having a thiol group in the molecule comprises at least one selected from the group consisting of nonyl mercaptan, 1-dodecanethiol, 1,2-ethanedithiol, 1,3-propanedithiol, triazinethiol, triazinedithiol, triazinetrithiol, 1,2,3-propanetrithiol, tetraethylene glycol-bis(3-mercaptopropionate), trimethylolpropane tris(3-mercaptopropionate), pentaerythritol tetrakis(3-mercaptopropionate), pentaerythritol tetrakis thioglycolate, dipentaerythritol hexakis(3-mercaptopropionate), tris[(3-mercaptopropionyloxy)-ethyl]-isocyanurate, 1,4-bis(3-mercaptobutyryloxy)butane, pentaerythritol tetrakis(3-mercaptobutyrate) and 1,3,5-tris(3-mercaptobutyloxyethyl)-1,3,5-triazine-2,4,6-(1H, 3H, 5H)-trione,
wherein the sheet has a thermal weight reduction percentage of 2.1% or less when the sheet is allowed to stand in an air atmosphere at 180° C. for 60 minutes,
wherein a weight average molecular weight of the urethane acrylate oligomer is 1000 to 30,000 and
wherein an amount of the energy ray polymerizable monomer is 30 to 300 parts by mass based on 100 parts by mass, in terms of solid, of the urethane acrylate oligomer.

15. A method according to claim 14, wherein the sheet has a thermal weight reduction percentage of 6% or less when the sheet stands in an air atmosphere at 180° C. for 60 minutes.

* * * * *